US011254609B1

(12) United States Patent
Jaunzemis

(10) Patent No.: US 11,254,609 B1
(45) Date of Patent: Feb. 22, 2022

(54) TUMBLED, POLISHED, VIBRATED BROKEN TEMPERED GLASS PIECES

(71) Applicant: Edgar Edward Jaunzemis, Rancho Cucamonga, CA (US)

(72) Inventor: Edgar Edward Jaunzemis, Rancho Cucamonga, CA (US)

( * ) Notice: Subject to any disclaimer, the term of this patent is extended or adjusted under 35 U.S.C. 154(b) by 1111 days.

(21) Appl. No.: 15/467,638

(22) Filed: Mar. 23, 2017

(51) Int. Cl.
| B24B 31/00 | (2006.01) |
| C03C 19/00 | (2006.01) |
| C03B 27/04 | (2006.01) |
| C03B 19/10 | (2006.01) |
| C03C 1/00 | (2006.01) |
| C03C 12/00 | (2006.01) |
| B24B 31/02 | (2006.01) |
| B24B 31/06 | (2006.01) |
| B02C 17/04 | (2006.01) |

(52) U.S. Cl.
CPC .............. *C03C 19/00* (2013.01); *B02C 17/04* (2013.01); *B24B 31/02* (2013.01); *B24B 31/06* (2013.01); *C03B 19/1005* (2013.01); *C03B 27/04* (2013.01); *C03C 1/002* (2013.01); *C03C 12/00* (2013.01)

(58) Field of Classification Search
CPC ......... C03C 19/00; C03C 1/002; C03C 12/00; C03C 25/002; C03C 1/00; C03C 1/1002; C03C 15/00; C03C 15/02; C03B 19/1005; B24B 31/02; B24B 31/06; B24B 31/00
See application file for complete search history.

(56) References Cited

U.S. PATENT DOCUMENTS

| 3,321,873 A | | 5/1967 | Leveskis | |
| 3,327,431 A | | 6/1967 | Smith et al. | |
| 4,569,156 A | * | 2/1986 | Yoder | B24B 31/06 451/326 |
| 5,140,783 A | * | 8/1992 | Hoffman | B24B 31/14 451/32 |
| 5,236,134 A | * | 8/1993 | Krawczyk | B03B 9/062 241/21 |
| 5,471,692 A | * | 12/1995 | Wasinger | D06B 11/0096 241/300 |
| 5,486,135 A | | 1/1996 | Arpaio | |

(Continued)

OTHER PUBLICATIONS

Judgment in a Civil Case: 15CV2866-JLS(BGS).
(Continued)

*Primary Examiner* — Lee D Wilson
(74) *Attorney, Agent, or Firm* — Lewis M Brande; Law Office of Lewis Brande

(57) ABSTRACT

An invention is provided for creating smoothed, heat-treated glass fragments. The invention includes placing a plurality of heat-treated glass fragments into a tumbling or vibrating apparatus. Each heat-treated glass fragment is formed from glass that has been heated to a temperature of at least 1000° Fahrenheit and rapidly cooled to a temperature below 800° Fahrenheit. The plurality of glass fragments is then tumbled or vibrated for a predetermined period of time such that surfaces of the heat-treated glass fragments are smoother than prior to tumbling. The glass fragments are thereafter removed from the tumbling apparatus, resulting in smoothed, heat-treated glass fragments that have a slightly rounded, bead like-shape and are suitable for direct handling without hand protection.

17 Claims, 11 Drawing Sheets

(56) References Cited

U.S. PATENT DOCUMENTS

| | | | |
|---|---|---|---|
| 5,507,685 A * | 4/1996 | Hoffman | B24B 31/02 134/7 |
| 6,284,186 B1 | 9/2001 | Hansen | |
| 6,409,500 B2 | 6/2002 | Georgantas | |
| 7,383,836 B2 * | 6/2008 | Klemming | F24B 1/181 126/190 |
| 7,976,360 B2 * | 7/2011 | Jaunzemis | B24B 31/10 451/35 |
| 8,419,505 B2 * | 4/2013 | Jaunzemis | F24B 1/1808 451/35 |
| 9,700,987 B1 * | 7/2017 | Jaunzemis | B24B 31/06 |
| 9,808,905 B2 * | 11/2017 | Jaunzemis | C03C 19/00 |
| 2005/0126225 A1 * | 6/2005 | Jaunzemis | C03C 19/00 65/61 |
| 2006/0003276 A1 * | 1/2006 | Bachinski | F24C 9/00 431/125 |
| 2006/0101854 A1 * | 5/2006 | Jaunzemis | C03C 1/002 65/21.3 |
| 2011/0269616 A1 * | 11/2011 | Jaunzemis | F24B 1/191 501/11 |
| 2014/0141957 A1 * | 5/2014 | Jaunzemis | B24B 31/06 501/11 |

OTHER PUBLICATIONS

Exhibit_1—Langfang-Tumbled-Fire1Glass.
Exhibit_2—AF-Website.
Exhibit_3—AF-Photographs.
Exhibit_4—Videos.
Exhibit_5—email-Langfang-Moderustic.
Exhibit_6—Oscar_Inclan.
Exhibit_7—Shapes.
Exhibit_8—Dangerous-Products.
Exhibit_9—Long-Term.
Exhibit_10—Net-Net.
Exhibit_11—Jaunzemis-Deposition.
Exhibit_12—Import-Genious.
Exhibit_13—Photograph_Auth.
Exhibit_14—Competitors.
Exhibit_15—Deposition-of_AF.
Exhibit_16—American-Fireglass-Dealers.

* cited by examiner

TUMBLED, POLISHED, VIBRATED BROKEN TEMPERED GLASS PIECES

CROSS REFERENCE TO RELATED APPLICATIONS

This application is a continuation of application Ser. No. 14/821,725 by inventor Edgar E. Jaunzemis, filed on Aug. 8, 2015, now U.S. Pat. No. 9,700,987, entitled "Tumbled, Polished, Vibrated Broken Tempered Glass Pieces," which is a continuation-in-part of application Ser. No. 13/863,373 by inventors Edgar E. Jaunzemis and Claudia S. Jaunzemis, filed on Apr. 15, 2013, now U.S. Pat. No. 9,808,905 ,entitled "Tumbled, Polished, Vibrated Broken Tempered Glass Pieces," which is a divisional of U.S. Patent Application having Ser. No. 13/180,434, filed on Jul. 11, 2011, now U.S. Pat. No. 8,419,505, by inventors Edgar E. Jaunzemis and Claudia S. Jaunzemis, and entitled "Tumbled, Polished, Vibrated Broken Tempered Glass Pieces," which is a continuation of U.S. Patent Application having Ser. No. 11/319,957, filed on Dec. 28, 2005, now U.S. Pat. No. 7,976,360, by inventors Edgar E. Jaunzemis and Claudia S. Jaunzemis, and entitled "Tumbled, Polished, Vibrated Broken Tempered Glass Pieces," which is a continuation-in-part of U.S. Patent Application having Ser. No. 10/413,620, filed on Apr. 14, 2003, by inventors Edgar E. Jaunzemis and Claudia S. Jaunzemis, and entitled "Tumbled, Polished, Vibrated Broken Tempered Glass Pieces," which is hereby incorporated by reference.

BACKGROUND OF THE INVENTION

1. Field of the Invention

This invention relates generally to systems and methods for processing waste and new product into new useful material, and more particularly to processing broken glass waste product into useful smooth glass pieces useful in, for example, lapidary construction, art, and functional interior and exterior decorating.

2. Description of the Prior Art

Currently, the benefits of recycling materials are well known. For example, many common household materials, such as paper, metals, and glass can be recycled for re-use. However, the cost of recycling varies depending upon the material, and for some materials, such as glass, the cost can be particularly high.

Glass recycling is costly because glass often is recycled for a generic use. As such, industries which use generic recycled glass typically require the glass to be largely contaminant free.so as to be put to a variety of uses. Household waste recycling programs generally do not discriminate between glass and ceramic recyclables, or between glasses of different colors. As such, glass recyclables collected by recycling authorities tend to be 10 a mixture of different colors of glasses and ceramics, as well as contaminants such as foil or paper labels and any non-recyclable refuse that finds its way into a bottle or jar or other refuse in a recycling bin.

To reduce the costs of generic glass recycling, specific uses for recycled glass have been developed. For example, U.S. Pat. No. 6,284,186 to Hansen discloses using comminuted, recycled, glass powders as filler in molded plastic parts. The recycled glass powder used in Hansen has non-uniform, rounded edges and is free from contaminants, such as grinding compounds, metals, inorganic, and organic waste materials. Hansen discloses using the recycled glass powder filler with a variety of different thermoplastics and thermosetting plastics commonly used to in injection molding and blow molding of plastic parts.

One type of glass waste product is broken glass. In general, once a glass pane is broken, there is little use for the broken shards or the remainder of the broken glass pane. Broken tempered glass, such as window shields for automobiles, presents a particular recycle problem because the resultant glass comprises small, sharp, glass pieces that are fire resistant.

In view of the foregoing, there is a need for systems and method for recycling broken, normal tempered glass waste product into smooth glass pieces useful in, for example, lapidary construction, art, and functional interior and exterior decorating. The systems and methods should provide a high efficiency in creating the smoothed glass pieces, and should not require specially-formulated glass or non-standard tempering processes.

SUMMARY OF THE INVENTION

Broadly speaking, embodiments of the present invention address these needs by disclosing systems and methods for generating useful, smooth glass pieces from normal heat-treated glass. The resulting smooth glass pieces are useful in, for example, lapidary construction, art, and functional interior and exterior decorating. In one embodiment, a method for creating smoothed, heat-treated glass fragments is disclosed. The method includes placing a plurality of heat-treated glass fragments into a tumbling apparatus. Each heat-treated glass fragment is formed from glass that has been heated to a temperature of at least 1000° Fahrenheit and rapidly cooled to a temperature below 700° Fahrenheit. The plurality of glass fragments are then tumbled for a predetermined period of time such that surfaces of the heat-treated glass-fragments are smoother than prior to tumbling. The glass fragments are thereafter-removed from the tumbling apparatus, resulting in smoothed, heat-treated glass fragments suitable for direct handling. The heat-treated glass fragments can be formed from fully tempered or toughened glass. For example, the heat-treated glass fragments can be formed from tempered glass that has been heated to a temperature in the range of about 1,200° to 1,600° Fahrenheit and rapidly cooled to a temperature below 600° Fahrenheit. In this case, the tempered glass has a surface compression of at least 10,000 PSI. Alternatively, each glass fragment can be formed from a plate of toughened glass that has a surface compression of at least 3,500 pounds-force PSI. In either case, the glass typically is rapidly cooled by application of an air quench that extracts heat uniformly from both surfaces of the glass and leaves the center area of the heated glass hotter than the surfaces. To further customize polishing, an aqueous or non-aqueous process can be used. Aqueous additives can be placed into the tumbling apparatus along with the heat-treated glass fragments during an aqueous process. Similarly, when utilizing a non-aqueous process, non-aqueous additives can be placed into the tumbling apparatus along with the heat-treated glass fragments.

A further method for creating smoothed, heat-treated glass fragments is disclosed in an additional embodiment of the present invention. In this embodiment, a plurality of heat-treated glass fragments is placed into a vibratory apparatus. As above, each heat-treated glass fragment is formed from glass that has been heated to a temperature of at least 1000° Fahrenheit and rapidly cooled to a temperature below 700° Fahrenheit. The plurality of glass fragments are then agitated for a predetermined period of time such that surfaces of the heat-treated glass fragments are smoother than prior to vibrating. The glass fragments are thereafter removed from the vibratory apparatus, resulting in smoothed, heat-treated glass fragments suitable for direct handling. As above, an aqueous or non-aqueous process can be used. Aqueous additives can be placed into the vibratory apparatus along with the heat-treated glass fragments during an aqueous process, and non-aqueous additives can be placed into the vibratory apparatus when utilizing a non-aqueous process. In a further embodiment, smoothed, heat-treated glass fragments prepared by a process comprising placing a plurality of heat-treated glass fragments into a tumbling apparatus are disclosed. In this embodiment, the smoothed, heat-treated glass fragments are formed from glass that has been heated to a temperature of at least 1000° Fahrenheit and rapidly cooled to a temperature below 700° Fahrenheit. The glass fragments are then tumbled for a predetermined period of time such that surfaces of the heat-treated glass fragments are smoother than prior to tumbling, and then removed from the tumbling apparatus. As above, an aqueous compound can be placed into the tumbling apparatus along with the heat-treated glass fragments, as can aqueous additives. Similarly, during a non-aqueous process, non-aqueous additives can be placed into the tumbling apparatus along with the heat-treated glass fragments.

The smoothed, heat-treated glass fragments of the embodiments of the present invention are suitable for direct handling and can be utilized in various projects including art, decoration, facade, stone work, lapidary, construction, paving, laminates, decorative, functional and nonfunctional interior and exterior decorating. In addition, because the smoothed glass pieces have been heat-treated, they can be utilized in heat related building and art projects, such as fire pits and fireplaces. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for generating useful, smooth glass pieces from standard fully tempered glass or heat-strengthened glass, that are useful in, for example, fireplaces, fire pits, lapidary construction, art, and functional interior and exterior decorating. Embodiments of the present invention do not require specially-formulated glass or non-standard tempering processes. The present invention methods provide a cost-effective means for in creating the smoothed glass pieces.

In addition, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

It is not uncommon for glass manufacturers to modify the percentage by weight to create a glass that is more specific to their unique requirements. It is for this reason that the formula given, is for representative purposes only.

Figure 1:
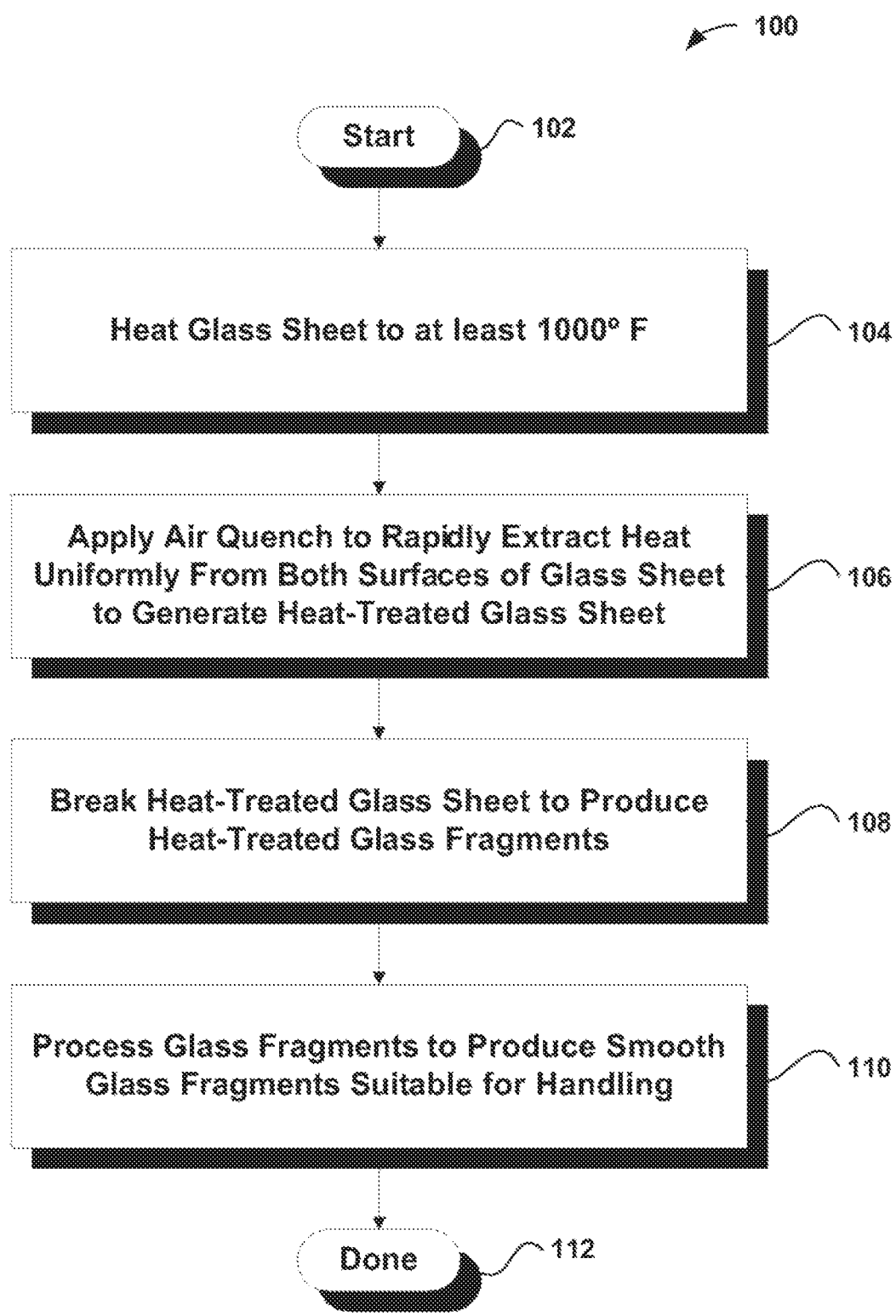
FIG. 1 is a flowchart showing a method for creating useful, smooth glass pieces from normal heat-treated glass, in accordance with an embodiment of the present invention.

FIG. 1 is a flowchart showing a method 100 for creating useful, smooth glass pieces from a heat-treated glass sheet, in accordance with an embodiment of the present invention. In an initial operation 102, preprocess operations are performed. Preprocess operations can include, for example, creating a glass sheet, coloring the glass sheet, and other preprocess operations that will be apparent to those skilled in the art after a careful reading of the present disclosure. The glass sheet can be comprised of a molten silica-based mix.

In operation 104, the glass sheet is heated to at least 1000° Fahrenheit. Typically, the glass sheet is heated to approximately 1,200° F. to 1,600° F. This high temperature is substantially at or above the glass's softening point. In one embodiment, a tempering furnace can be used to heat the glass sheet. The tempering furnace may be of a continuous roller-type, fixtured roller-type, or gas-type. A gas-type tempering furnace has a plurality of blocks disposed beneath a plurality of radiant heaters. Typically, a glass sheet is placed inside the tempering furnace where the glass sheet is heated by conventional radiation, convection, and conduction heat. The glass sheet is moved along the blocks, at a predetermined rate, which depends upon the thermal conductivity of the glass sheet.

In operation 106, an air quench is applied to the glass sheet to rapidly extract heat uniformly from both surfaces of the glass sheet, thus generating a heat-treated or tempered glass sheet. The air quench typically is applied by an air stream system. The air stream system, can comprise arrays of fixed, reciprocating, or rotating nozzles. Heat is extracted uniformly from both surfaces of the glass sheet, and the quench is sustained long enough to prevent reheating of the glass surfaces from the still-hot center of the glass sheet. Uneven heat extraction may produce bow or warp. The quenched condition becomes stable when the glass sheet is reduced to a temperature of approximately 400° Fahrenheit to 600° Fahrenheit.

The immediate and sustained application of the air quench leaves the center of the glass sheet relatively hot compared to the surfaces. As the center area cools, it forces the surfaces and edges into a compressed state. As a result, a surface compression of at least 3,500 PSI to about 10,000 PSI is created.

Figure 2:
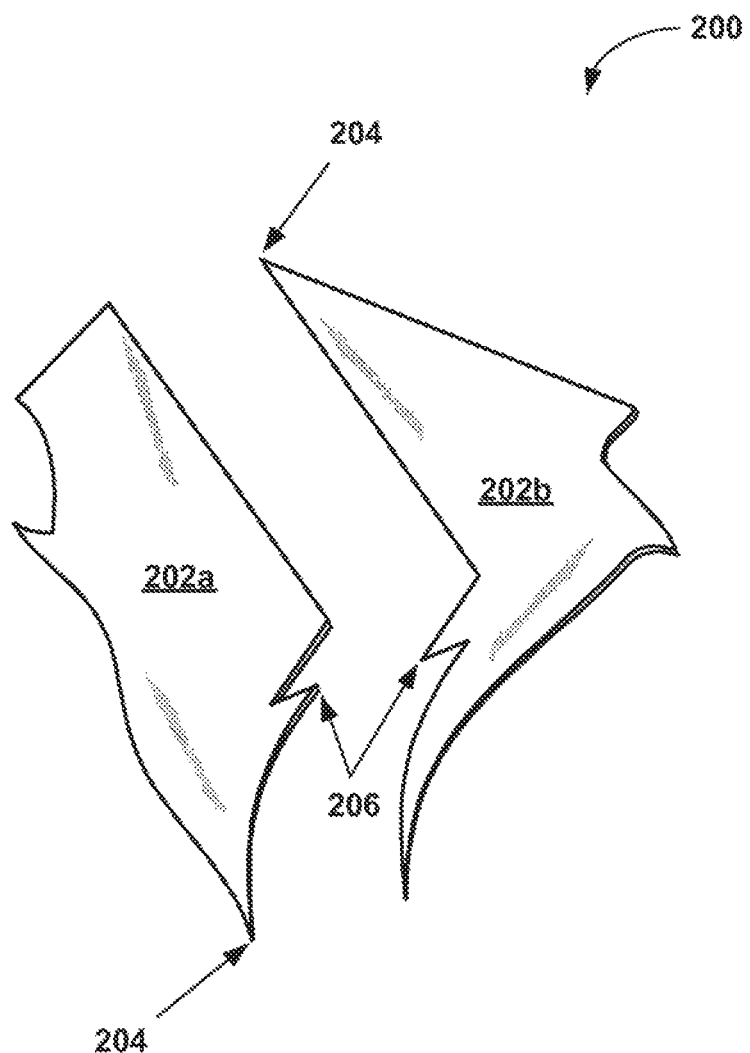
FIG. 2 is an illustration showing exemplary broken glass shards from non-tempered glass.

The heat-treated glass sheet is then broken to produce heat-treated or standard fully tempered glass fragments, in operation 108. The heat-treated glass has a unique fracture pattern, which causes the glass to break into small shaped fragments having jagged edges and sharp corners. Glass that is not heat-treated as described above generally breaks into large sharp shards as illustrated in FIG. 2. FIG. 2 is an illustration showing exemplary broken glass shards 200 from non-tempered glass. As illustrated in FIG. 2, each glass shard 202a and 202b generally is relatively large and includes very sharp edges 204 and sharp burs 206.

Figure 3A:
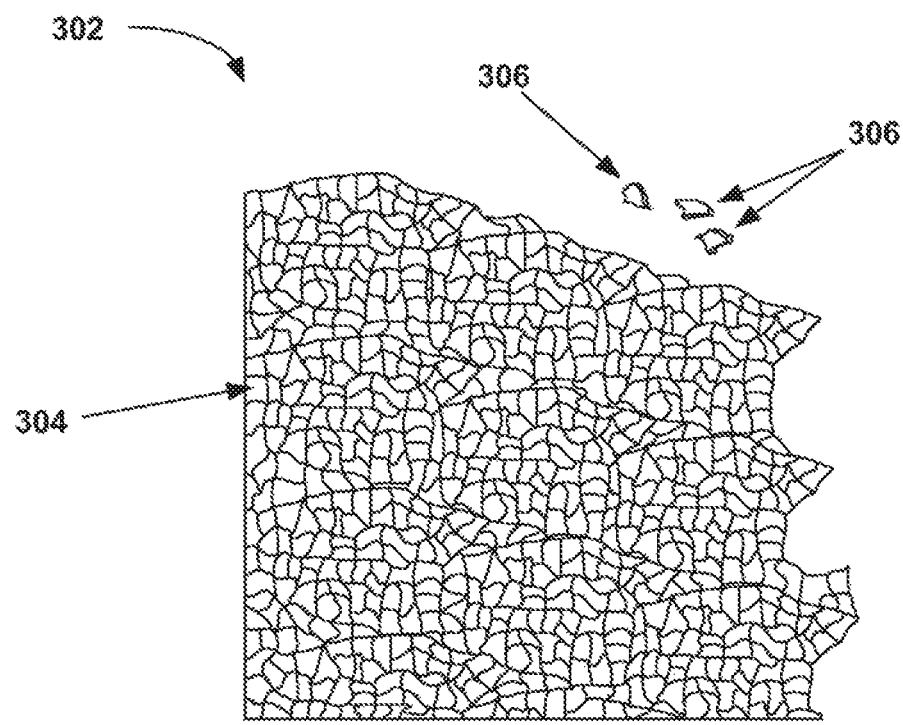
FIG. 3A is an illustration showing exemplary broken heat-treated glass, in accordance with an embodiment of the present invention.
Figure 3B:
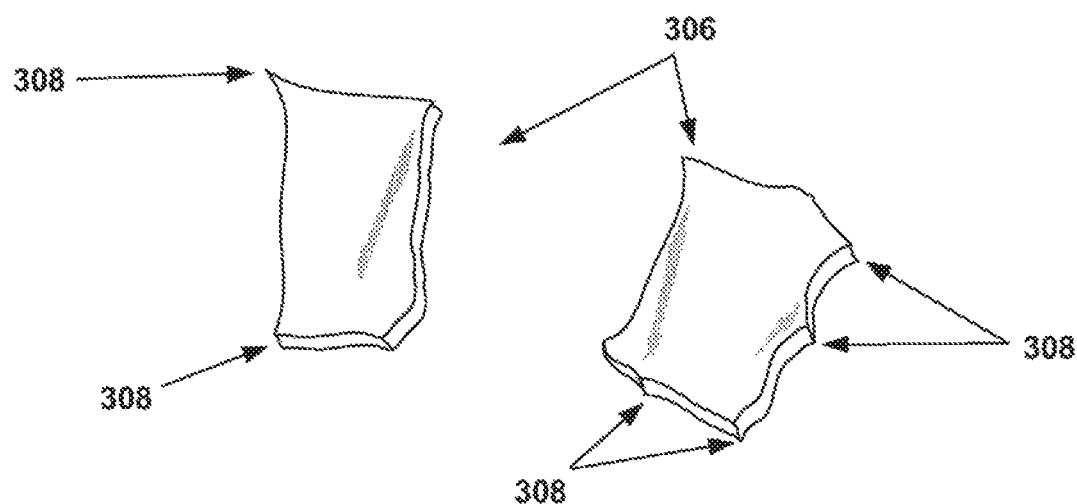
FIG. 3B is an illustration showing a magnified view of exemplary broken heat-treated glass fragments, in accordance with an embodiment of the present invention.

FIG. 3A is an illustration showing exemplary sheet of standard tempered glass plate broken per the method shown in FIG. 1 heat-treated glass 302, in accordance with an embodiment of the present invention. As illustrated in FIG. 3A, a broken sheet of heat-treated glass 302 exhibits a unique fracture pattern 304, which causes the glass to break into small heat-treated glass fragments 306 having jagged edges, sharp edges, sharp burrs and sharp corners. FIG. 3B is an illustration showing a magnified view of exemplary broken heat-treated glass fragments 306, in accordance with an embodiment of the present invention. Unlike the glass shards of FIG. 2, each heat-treated glass fragment 306 is small and relatively uniform in size. In addition, each heat-treated glass fragment 306 includes sharp edges 308 that make the heat-treated glass fragments generally unsuitable for direct handling without some form of hand protection.

Referring back to FIG. 1, the heat-treated glass fragments are processed to produce smooth glass fragments suitable for direct handling, in operation 110. As will be discussed in greater detail subsequently, embodiments of the present invention process the heat-treated glass fragments via tumbling and/or polishing and/or vibrating. It should be noted that the term heat-treated glass shall refer to any glass that is processed to create a surface compression such that the fraction pattern of the glass results in many small glass fragments. Hence, the term heat-treated glass shall refer to, for example, standard fully tempered glass, heat-strengthened glass, also known as toughened glass, or any other glass heat processed to create a similar fracture pattern. Post process operations are performed in operation 112. Post process operations can include, for example, using the smoothed glass pieces in fireplaces, fire pits, art, decoration, facade, stone work, lapidary, construction, paving, laminates, decorative, functional and nonfunctional interior and exterior decorating.

Figure 4:
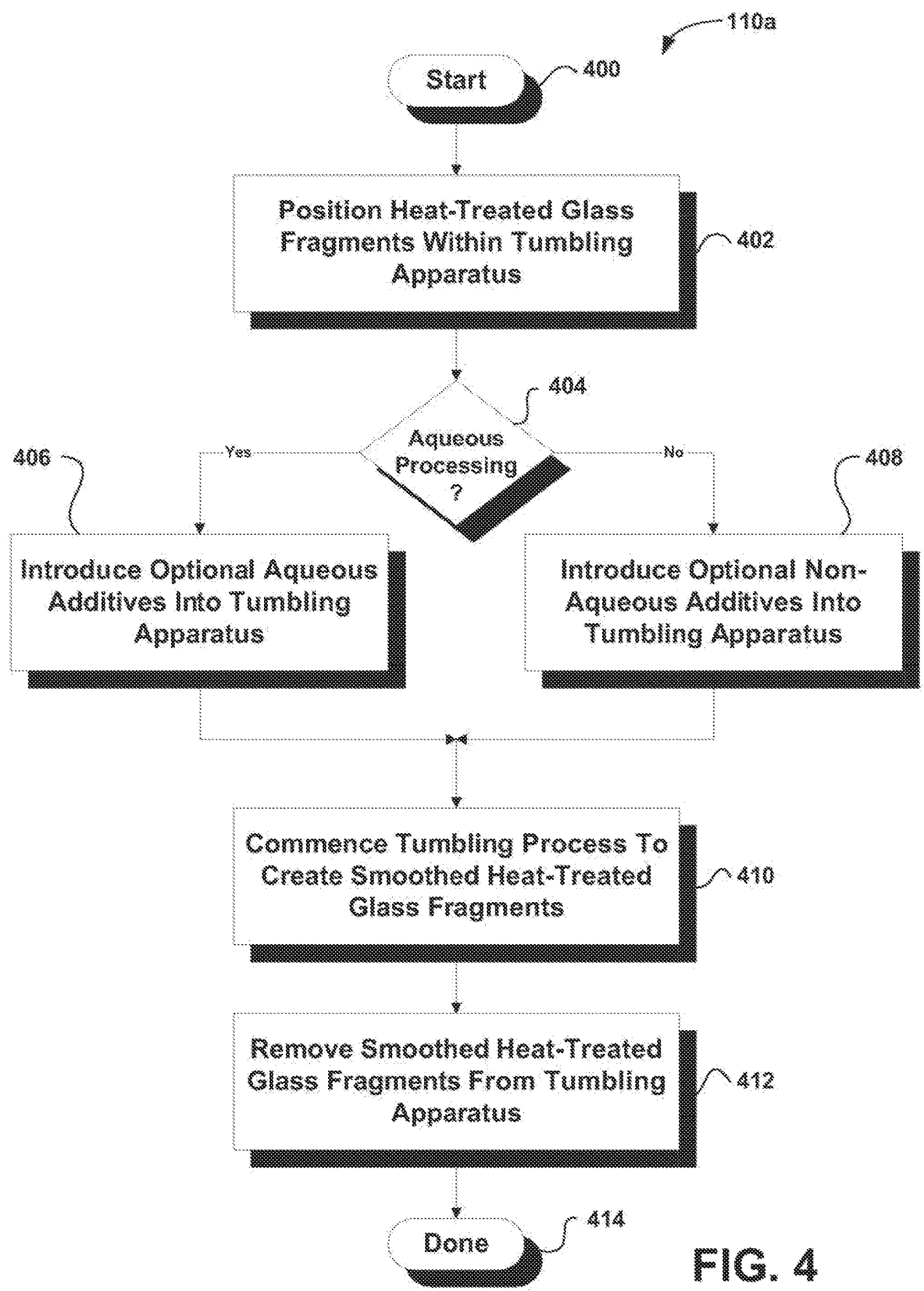
FIG. 4 is a flowchart showing a process for producing smooth glass fragments suitable for direct handling from heat-treated glass fragments, in accordance with an embodiment of the present invention.

FIG. 4 is a flowchart showing a process 110a for producing smooth glass fragments suitable for direct handling from heat-treated glass fragments, in accordance with an embodiment of the present invention. In an initial operation 400, pre-process operations are performed. Pre-process operations can include, for example, heating and rapidly cooling a glass sheet, obtaining tempered or heat-strengthened glass, breaking the glass so as to form broken heat-treated glass fragments, and other preprocess operations that will be apparent to those skilled in the art after a careful reading of the present disclosure.

In operation 402, the heat-treated glass fragments are positioned in a tumbling apparatus. Although any tumbling apparatus capable of tumbling the heat-treated glass fragments over time can be utilized with the embodiments of the present invention, FIGS. 5A and 5B are exemplary illustrations showing exemplary tumbling apparatuses for use in processing broken heat-treated glass fragments.

Figure 5A:
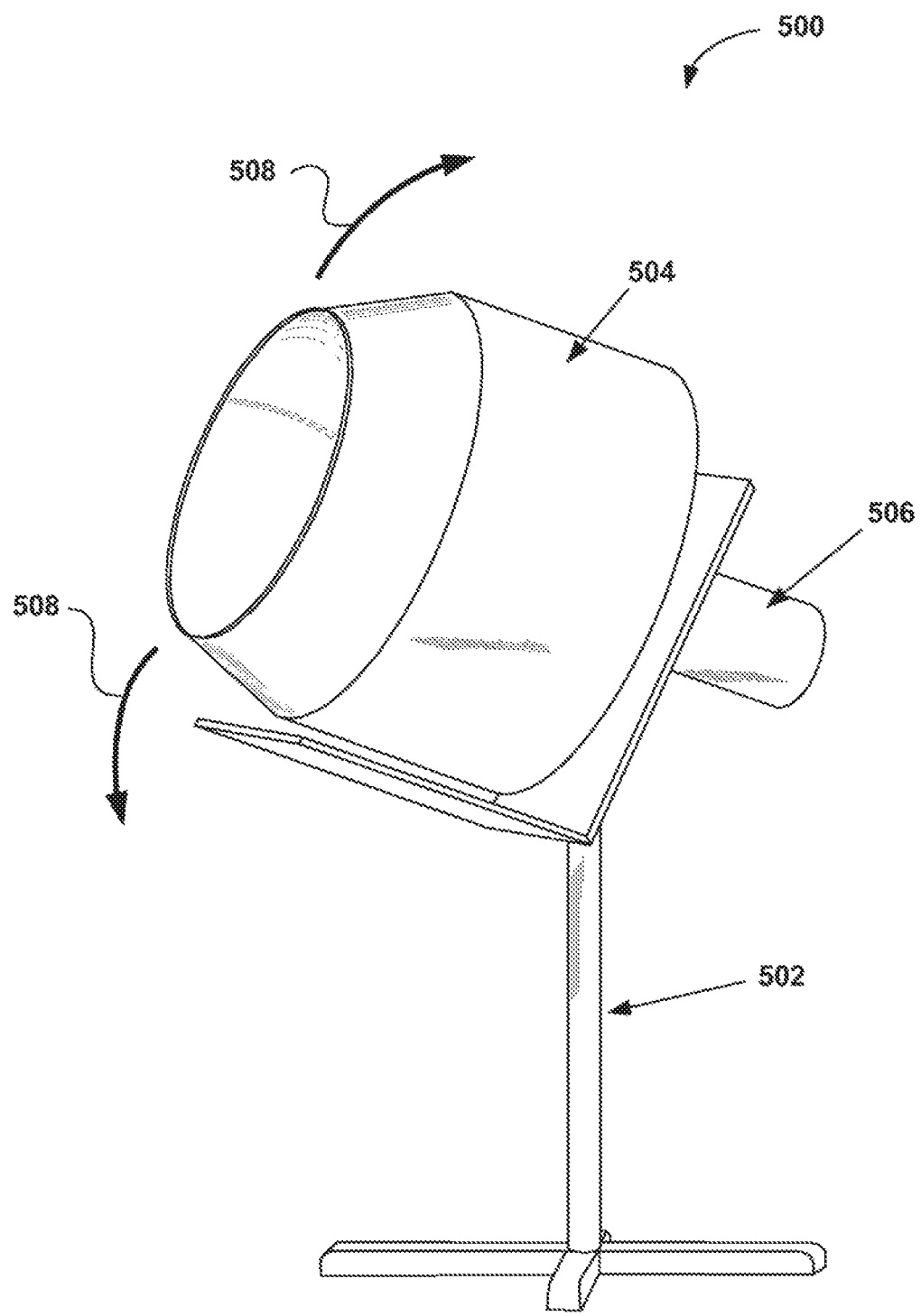
FIG. 5A is an illustration showing an exemplary tumbling apparatus.

In particular, FIG. 5A is an illustration showing an exemplary tumbling apparatus 500, in accordance with an embodiment of the present invention. The exemplary tumbling apparatus 500 includes a base frame 502, tumbling drum 504, and a motor 506 attached to both the base frame 502 and tumbling drum 504 for drum 504 rotation. In one embodiment, the rotation drum 504 can comprise a ferrous or non-ferrous container, steel, plastic, copper, or stainless steel. The motor 506 operates to rotate the tumbling drum 504 during glass processing, as will be described in greater detail below. After obtaining the broken heat-treated glass fragments, as described above, the heat-treated glass fragments are placed within the tumbling drum 504. The tumbling drum 504 can be positioned as indicated by the tilt arrows 508 in FIG. 5A. As a result, the tumbling drum 504 can be positioned such that the glass will be tumbled horizontal, vertically, or at any angle between 0° and 90°.

Figure 5B:
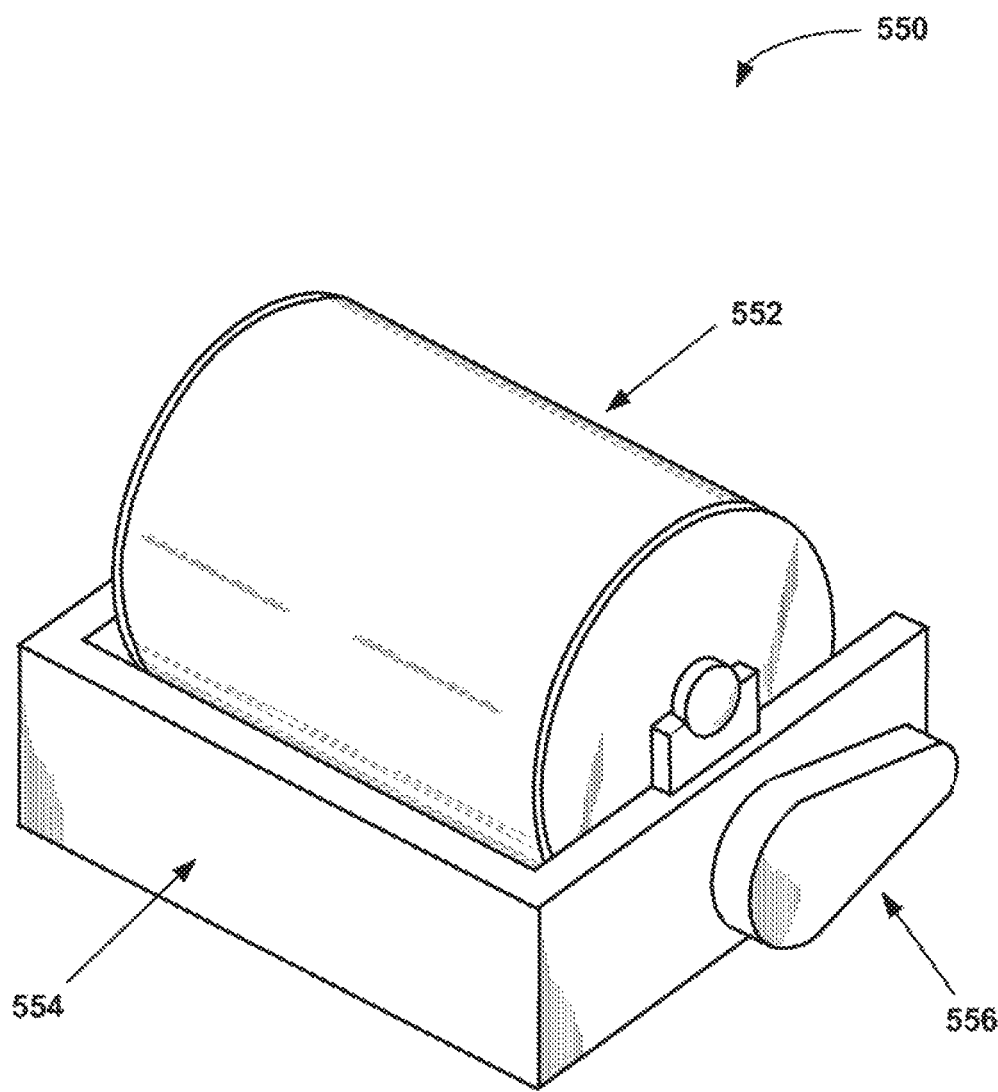
FIG. 5B is an illustration showing an exemplary horizontal tumbling apparatus.

FIG. 5B is an illustration showing an exemplary horizontal tumbling apparatus 550. The horizontal tumbling apparatus 550 includes a lateral tumbling drum 552, a base frame 554, and a pulley-based motor 556. The pulley-based motor 556 is attached to the base frame 554 and is further in communication with the lateral tumbling drum 552 via a drive belt. As above, the pulley-based motor 556 operates to rotate the tumbling drum 554 during glass processing. Similar to above, when utilizing the horizontal tumbling apparatus 550 of FIG. 5B, the heat-treated glass fragments are placed within the lateral mixing drum 552 during operation 402.

Embodiments of the present invention can process the broken heat-treated glass fragments either aqueously or non-aqueously. Hence, in operation 404, a decision is made as to whether the heat-treated glass fragments will be processed aqueously. If aqueous processing will be performed, the process 110a branches to operation 406. Otherwise, the process 110a branches to operation 408.

As stated above, when aqueous processing will be performed, the process 110a branches to operation 406 where optional aqueous additives are introduced to the tumbling apparatus. Referring to FIG. 5A, when utilizing aqueous processing an aqueous compound is poured into the tumbling drum 504. The aqueous compound then operates to surround the previously inserted heat-treated glass fragments and assists in smoothing during the tumbling process. Optionally, additives can be added to the aqueous compound to achieve various smoothing effects. For example, serum oxide can be mixed with water to aqueously process the heat-treated glass pieces. In addition, silicon carbide, tin oxide, and aluminum oxide are further exemplary additives that can be added to the aqueous compound.

Referring back to FIG. 4, when non-aqueous processing will be performed, the process 110a branches to operation 408 where optional non-aqueous additives are introduced to the tumbling apparatus. Referring to FIG. 5A, when utilizing non-aqueous processing optional non-aqueous additives can be inserted into the tumbling drum 504 along with the heat-treated glass fragments to achieve various smoothing effects. For example, silica sand can be placed in the tumbling drum 504 to assist in processing the heat-treated glass pieces. In addition, silicon carbide, tin oxide, and aluminum oxide are further exemplary additives that can be inserted into the tumbling drum 504.

After adding any, optional additives to the tumbling apparatus in operation 406, during aqueous processing, or operation 408, during non-aqueous processing, the tumbling process is commenced to smooth the heat-treated glass fragments. Turning to. FIG. 5A, the tumbling drum 504 is rotated to tumble the heat-treated glass fragments along with any additives. During tumbling, the relative motion between the heat-treated polygonal and irregular shaped glass fragments and the treating elements, i.e., the aqueous compound and optional additives or non-aqueous additives, and against each other alter the surface of the heat-treated glass fragments. Hence, the relative motion polishes, de-burs, and smoothes the heat-treated glass fragments so as to become suitable for handling.

When an aqueous tumbling process is utilized, as described in operation 406, the heat-treated glass fragments can achieve a high degree of polished texture. Alternatively, a rougher texture can be achieved utilizing a non-aqueous tumbling process, as described in operation 408. Embodiments of the present invention typically tumble the heat-treated glass for a time period in the range of about 15 minutes to 2 hours, depending on the polishing effect desired. For example, shorter tumble times result in smooth bead-like heat-treated glass fragments that are less polished than result when using longer tumble times. In addition, longer tumble times generally result in more rounding of the heat-treated glass fragments than result using shorter tumble times. For example, tumbling the heat-treated glass fragments for 2 hours typically results in smooth, very rounded, bead-like heat-treated glass fragments.

Figure 6:
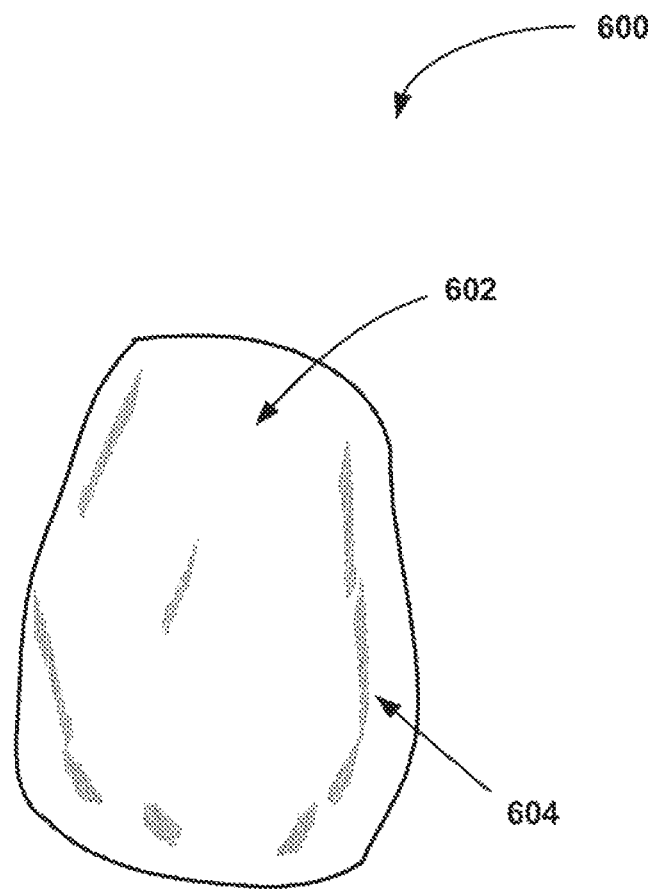
FIG. 6 is an illustration showing an exemplary smoothed, heat-treated glass fragment after being processed according to the embodiments of the present invention.

In operation 412, the smoothed, bead-like or bead-like heat-treated glass fragments are removed from the tumbling apparatus. As stated previously, the resulting smoothed, bead-like heat-treated glass fragments are suitable for direct handling. FIG. 6 is an illustration showing an exemplary smoothed, bead-like heat-treated glass fragment 600 after being removed from the tumbling apparatus in operation 412. As illustrated in FIG. 6, the surface 602 of the bead-like heat-treated glass fragment 600 is smooth, having smoothed edges 604 free of sharp burrs. As a result, the smoothed, bead-like heat-treated glass fragment 600 can be directly handled without hand protection and utilized in various projects including art, decoration, facade, stone work, lapidary, construction, paving, laminates, decorative, functional and nonfunctional interior and exterior decorating.

Post process operations are performed in operation 414. Post process operations can include, for example, drying the smoothed, bead-like heat-treated glass fragments during an aqueous tumbling process, cleaning additive material from the smoothed, bead-like heat-treated glass fragments, and other post process operations that will be apparent to those skilled in the art after a careful reading of the present disclosure. In addition to smoothing the broken heat-treated glass pieces via tumbling, an embodiment of the present invention can produce smooth bead-like heat-treated glass fragments via vibration, as described next with reference to FIG. 7.

Figure 7:
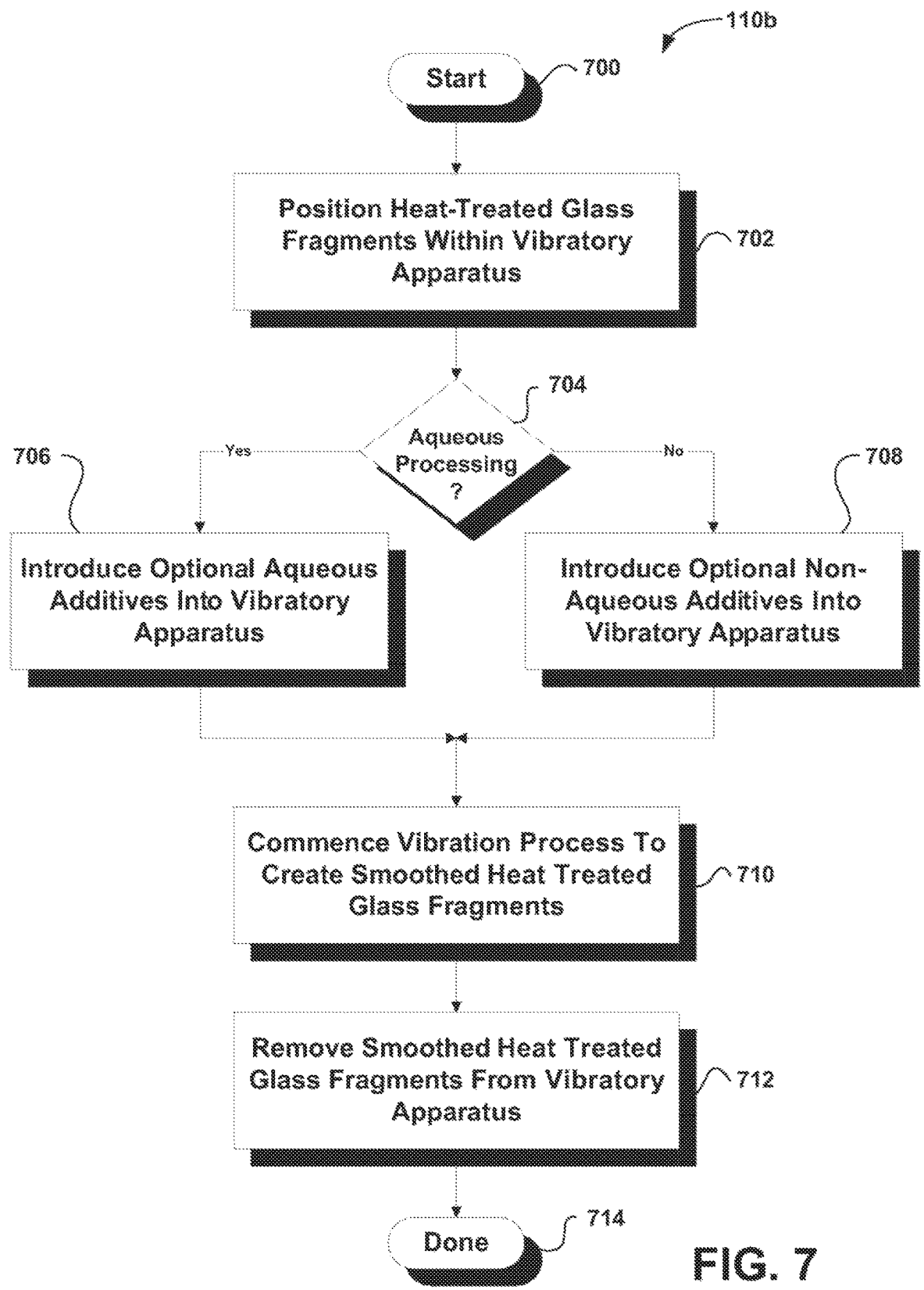
FIG. 7 is a flowchart showing a process for producing smooth glass fragments suitable for direct handling from heat-treated glass fragments utilizing a vibratory apparatus, in accordance with an embodiment of the present invention.

FIG. 7 is a flowchart showing a process 110b for producing smooth glass fragments suitable for direct handling from heat-treated glass fragments utilizing a vibratory apparatus, in accordance with an embodiment of the present invention. In an initial operation 700, preprocess operations are performed. Preprocess operations can include, for example, heating and rapidly cooling a glass sheet, obtaining tempered or heat-strengthened glass, breaking the glass so as to form broken heat-treated glass fragments, and other preprocess operations that will be apparent to those skilled in the art after a careful-reading of the present disclosure.

In operation 702, the heat-treated glass fragments are positioned in a vibratory apparatus. Although any vibratory apparatus capable of tumbling the heat-treated glass fragments over time can be utilized with the embodiments of the present invention, FIG. 8 is an exemplary illustration showing an example vibratory apparatus for use in processing broken heat-treated glass fragments.

Figure 8:
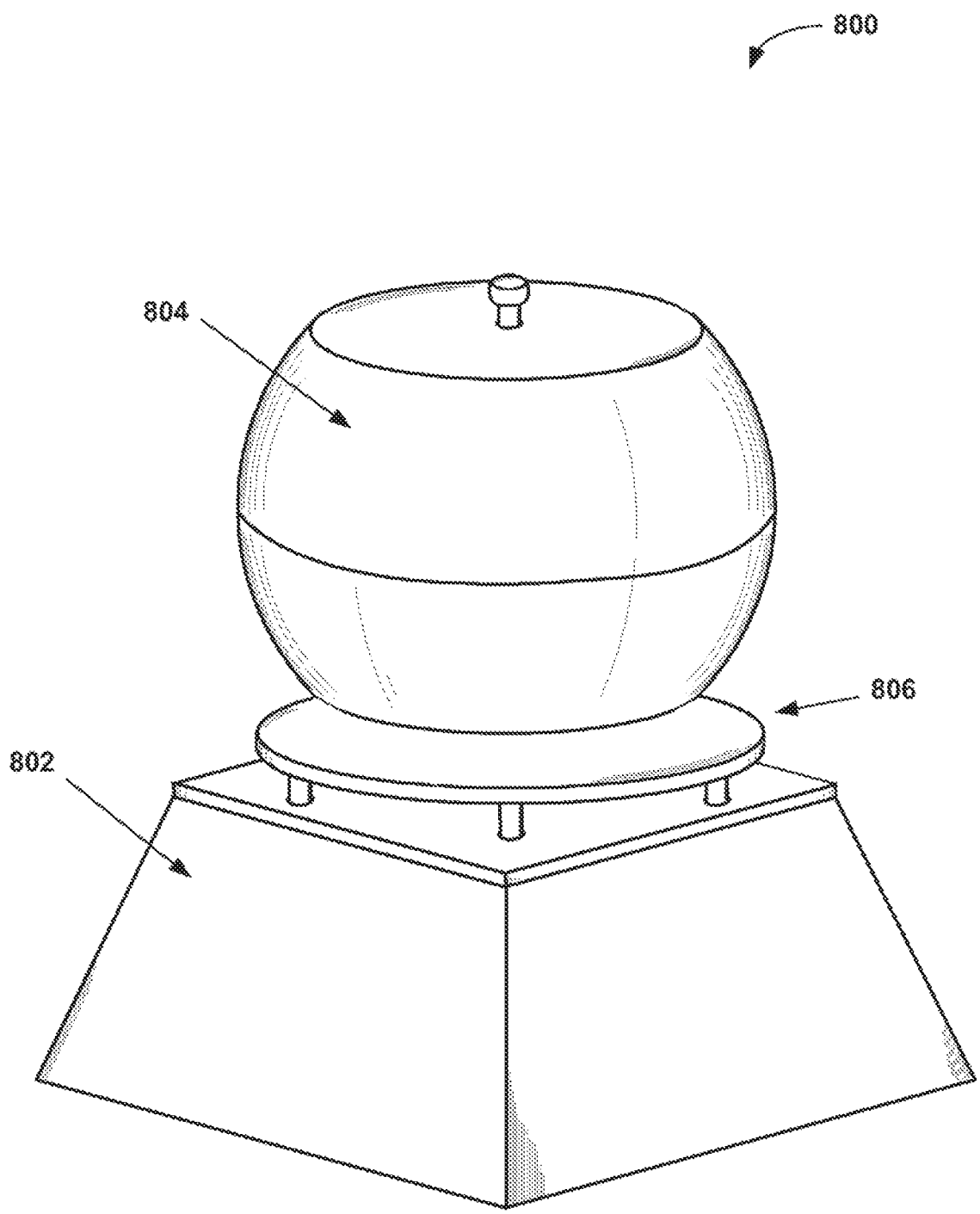
FIG. 8 is an illustration showing an exemplary vibratory apparatus.

In particular, FIG. 8 is an illustration showing an exemplary vibratory apparatus 800. The exemplary vibratory apparatus 800 includes a base frame 802, vibratory drum 804, and a vibratory motor 806 attached to both the base frame 802 and vibratory drum 804 for drum 804 vibration. In one embodiment, the vibratory drum 804 can comprise a ferrous or non-ferrous container, plastic, copper, or stainless steel. The motor 806 operates to vibrate the vibratory drum 804 at a high frequency during glass processing, as will be described in greater detail below. After obtaining the broken heat-treated glass fragments, as described above, the heat-treated glass fragments are placed within the vibratory drum 804. Similar to tumbling, the vibratory drum 804 can be positioned such that the glass will be tumbled horizontal, vertically, or at any angle between 0° and 90°.

As mentioned previously, embodiments of the present invention can process the broken heat-treated glass fragments either aqueously or non-aqueously. Hence, in operation 704, a decision is made as to whether the heat-treated glass fragments will be processed aqueously. If aqueous processing will be performed, the process 110b branches to operation 706. Otherwise, the process 110b branches to operation 708. As stated above, when aqueous processing is performed, the process 110b branches to operation 706 where optional aqueous additives are introduced to the vibratory apparatus. Referring to FIG. 8, during aqueous processing an aqueous compound is poured into the vibratory drum 804. The aqueous compound then operates to surround the previously inserted heat-treated glass fragments and assists in smoothing during the vibration process. Optionally, additives can be added to the aqueous compound to achieve various smoothing effects. For example, serum oxide can be mixed with water to aqueously process the heat-treated glass pieces.

Referring back to FIG. 7, when non-aqueous processing will be performed, the process 110b branches to operation 708, where optional non-aqueous additives are introduced to the tumbling apparatus. Referring to FIG. 8, when utilizing non-aqueous processing, optional non-aqueous additives can be inserted into the vibratory drum 804 along with the heat-treated glass fragments to achieve various smoothing effects. For example, silica sand placed in the vibratory drum 804 could assist in processing the heat-treated glass pieces.

After adding any optional additives to the vibratory apparatus in operation 706, during aqueous processing, or operation 708, during non-aqueous processing, the vibration process is commenced to smooth the heat-treated glass fragments. Turning to FIG. 8, the vibratory drum 804 is vibrated at a high frequency to vibrate the heat-treated glass fragments along with any additives. The vibration of the heat-treated glass fragments and the treating elements, i.e., the aqueous compound and optional additives or non-aqueous additives, alter the surface of the heat-treated glass fragments. As a result, the vibratory motion polishes, de-burs, and smoothes the sharp heat-treated glass fragments into heat-treated fragments that have a bead-like shape so as to become suitable for direct human handling.

When an aqueous vibratory process is utilized, as described in operation 706, the heat-treated glass fragments can achieve a high degree of polished texture. Alternatively, a rougher texture can be achieved utilizing a non-aqueous vibratory process, as described in operation 708. Embodiments of the present invention typically vibrate the heat-treated glass fragments for a time period in the range of about 15 minutes to 2 hours, depending on the polishing effect desired. For example, shorter vibration times result in smoothed heat-treated glass fragments that are less polished than result when using longer vibration times. In addition, longer vibration times generally result in more rounding of the heat-treated glass fragments than result using shorter vibration times. For example, vibrating the sharp heat-treated glass fragments for 2 hours can typically result in smooth, very rounded, bead-like heat-treated glass fragments.

In operation 712, the smoothed, bead-like heat-treated glass fragments are removed from the vibratory apparatus. As stated previously, the resulting smoothed, bead-like heat-treated glass fragments are suitable for direct handling and can be utilized in various projects including in art, decoration, facade, stone work, lapidary, construction, paving, laminates, decorative, functional and nonfunctional interior and exterior decorating.

Post process operations are performed in operation 714. Post process operations can include, for example, drying the smoothed, bead-like heat-treated glass fragments during an aqueous process, cleaning additive material from the smoothed, bead-like heat-treated glass fragments, and other post, process operations that will be apparent to those skilled in the art after a careful reading of the present disclosure.

Figure 9:
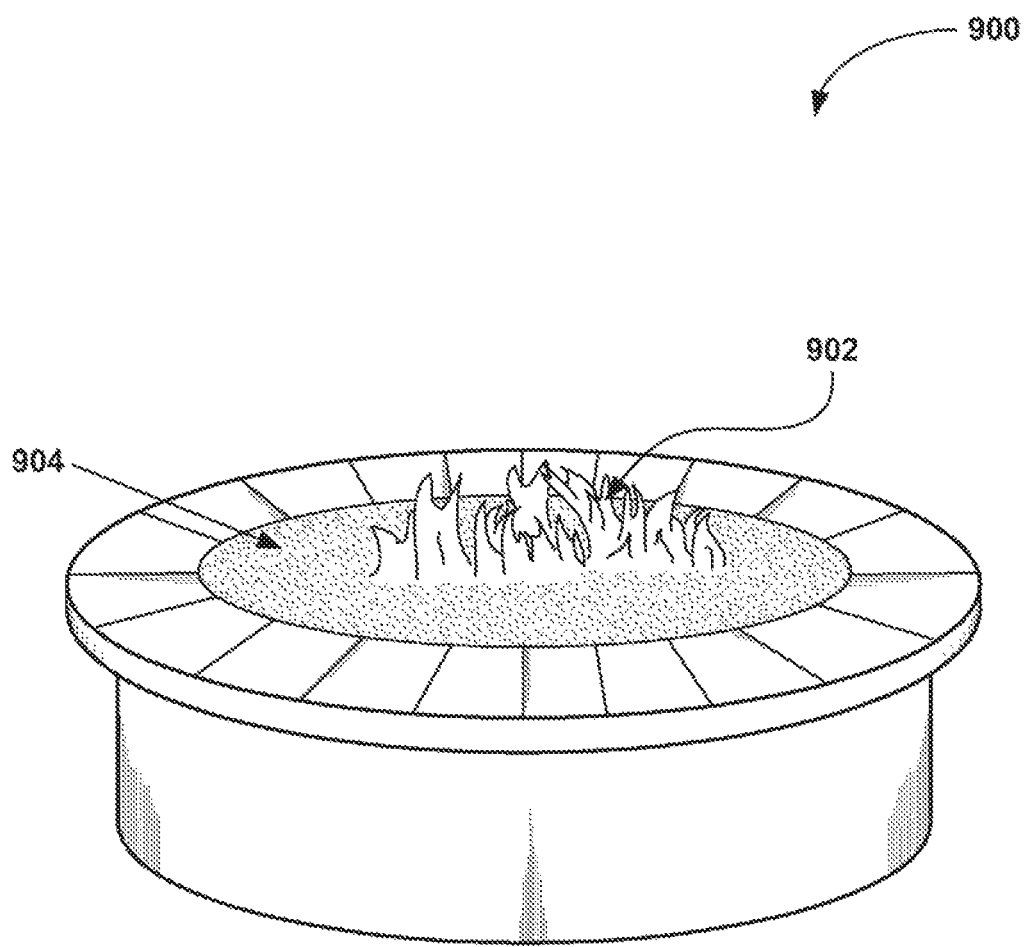
FIG. 9 is an illustration showing an exemplary use of the smoothed heat-treated glass pieces in a fire pit, in accordance with an embodiment of the present invention.

As mentioned above, the smoothed, bead-like heat-treated glass pieces can be utilized in a variety of projects. In addition, because the smoothed glass pieces have been heat-treated, they can be utilized in heat related building and art projects, such as fire pits and fireplaces. FIG. 9 is an illustration showing an exemplary use of the smoothed bead-like heat-treated glass pieces in a fire pit 900, in accordance with an embodiment of the present invention. The fire pit 900 includes a gas fire 902 formed on a plurality of smoothed, bead-like heat-treated glass fragments 904. Typically, the smoothed, bead-like heat-treated glass fragments 904 can be formed around a gas line situated within the fire pit 900.

Normal, non-heat-treated glass subjected to the heat of the gas fire 902 will distort, explode, melt, or otherwise be damaged from the heat. However, because the smoothed bead-like glass pieces 904 of the embodiments of the present invention have been heat-treated, for example standard fully tempered or toughened glass, the smoothed, bead-like heat-treated glass pieces 904 will not distort, explode, or otherwise be damaged by the gas fire 902. This allows for a clean burning gas fire 902.

Figure 10:
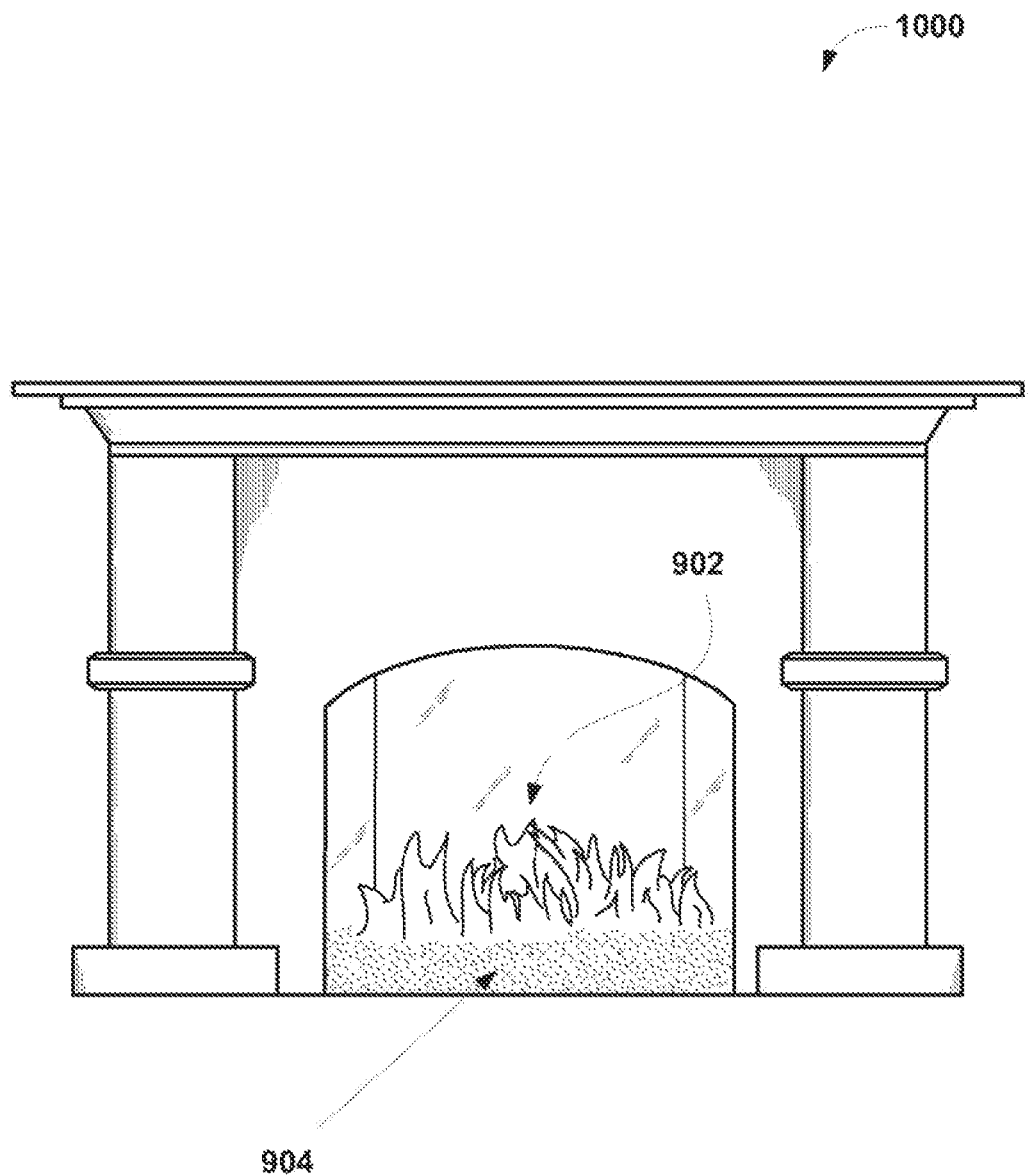
FIG. 10 is an illustration showing an exemplary use of the smoothed heat-treated glass pieces in a fireplace, in accordance with an embodiment of the present invention.

FIG. 10 is an illustration showing an exemplary use of the smoothed bead-like heat-treated glass pieces in a fireplace 1000, in accordance with an embodiment of the present invention. Similar to the fire pit of FIG. 9, the fireplace 1000 of FIG. 10 includes a gas fire 902 formed on a plurality of smoothed, bead-like heat-treated glass fragments 904. Typically, the smoothed, bead-like or heat-treated glass fragments 904 can be formed around gas line situated within the fireplace 1000. As mentioned above, the smoothed, bead-like heat-treated glass pieces 904 will not distort, explode, or otherwise be damaged by the gas fire 902 because the smoothed bead-like glass pieces 904 of the embodiments of the present invention have been heat-treated. This allows for a very clean burning gas fire 902. In addition, the smoothed, bead-like heat-treated glass fragments 904 radiate heat and allow increased efficiency because nothing blocks the radiant heat from the gas fire 902 and the heated glass fragments 904.

Although the foregoing invention has been described in some detail for purposes of clarity of understanding, it will be apparent that certain changes and modifications may be practiced within the scope of the invention. Accordingly, the present embodiments are to be considered as illustrative and not restrictive, and the invention is not to be limited to the details given herein, but may be modified within scope and equivalents of the invention.

What is claimed is:

1. A process for forming once heat-treated standard tempered glass fragments suitable for insertion onto a gas fired burner in an enclosure, the once heat-treated standard tempered glass fragment comprising:
    a plurality of once heat-treated standard tempered glass fragments suitable to cover a plurality of gas emitting holes in the gas fired burner;
    each member of the plurality of once heat-treated standard tempered glass fragments having a random shape with a sharp edge, a sharp corner and a sharp burr;
    each member of the plurality of once heat-treated standard tempered glass fragments made from broken once heat-treated standard tempered glass plates that have a surface compression of at least 3,500 and up to 10,000 pounds-force per square inch (psi);
    the plurality of once heat-treated standard tempered glass fragments being processed to force each member to rub against an adjacent member so as to slightly round each of the sharp edges, the sharp corners, and the sharp burrs; and
    wherein an unshielded human hand can safely hold a group of once heat-treated standard tempered glass fragments selected from the plurality of once heat-treated standard tempered glass fragments without bleeding or damage to a skin surface of the hand.

2. The process for forming the once heat-treated standard tempered glass fragments of claim 1, wherein the process further comprises tumbling.

3. The process for forming the once heat-treated standard tempered glass fragments of claim 1, wherein the process further comprises vibrating.

4. The process for forming the once heat-treated standard tempered glass fragments of claim 1, wherein each member of the plurality of once heat-treated standard tempered glass fragments has a substantially rounded bead-like shape.

5. The process for forming the once heat-treated standard tempered glass fragments of claim 1, wherein the plurality of once heat-treated standard tempered glass fragments is colored.

6. The process for forming the once heat-treated standard tempered glass fragments of claim 1, wherein the plurality of once heat-treated standard tempered glass fragments does not have fines located therein.

7. The process for forming the once heat-treated standard tempered glass fragments of claim 1, wherein the process further comprises an aqueous solution.

8. A process for forming the once heat-treated standard glass fragments suitable for insertion into a fireplace with a gas burner that is producing a gas fire, an improvement comprising:

a layer of broken non-cubical once heat-treated standard tempered glass fragments surrounding the gas fire;

the layer of non-cubical once heat-treated standard tempered glass fragments being made from broken once heat-treated standard tempered glass plates that have a surface compression of at least 3,500 and up to 10,000 pounds-force per square inch (psi);

the layer of broken non-cubical once heat-treated standard tempered glass fragments having a unique fracture pattern dependent upon the heat-treat temperature and quench then breaking the once heat-treated standard tempered glass plates;

the layer of broken non-cubical once heat-treated standard tempered glass fragments formed from non-cubical once heat-treated standard tempered glass fragments having sharp edges, sharp corners, and sharp burrs;

the layer of broken non-cubical once heat-treated standard tempered glass fragments having sharp edges, corners, and burrs the fragments then being processed to having slightly rounded sharp edges, slightly rounded sharp corners, and slightly rounded sharp burrs making the broken processed non-cubical once heat-treated standard tempered glass fragments safe to handle by a human hand without hand protection;

wherein the processing of the broken non-cubical once heat-treated standard tempered glass fragments causes the broken non-cubical once heat-treated standard tempered glass to impact each other, smoothing the sharp edges, the sharp corners, and the sharp burrs of the non-cubical once heat-treated standard tempered glass fragments, resulting in broken non-cubical once heat-treated standard tempered glass fragments that are safe to handle without causing injury to the human hand, wherein a majority of small glass fines have been removed from the broken non-cubical once heat-treated standard tempered glass fragments;

wherein the non-cubical once heat-treated standard tempered glass fragments do not distort, explode, or otherwise be damaged by the gas fire; and wherein the non-cubical once heat-treated standard tempered glass fragments provide a clean burning gas fire and radiate heat providing increased efficiency and does not block the radient heat generated by the gas fire-heating the once heat-treated standard tempered glass fragments.

9. The process for forming once heat-treated standard glass fragments suitable for insertion into a fireplace with a gas burner that is producing a gas fire, where the once heat-treated standard tempered glass fragments of claim 8, wherein the process further comprises tumbling.

10. The process for forming once heat-treated standard glass fragments suitable for insertion into a fireplace with a gas burner that is producing a gas fire, where the once heat-treated standard tempered glass fragments of claim 8, wherein the process further comprises vibrating.

11. The process for forming once heated-treated standard glass fragments suitable for insertion into a fireplace with a gas burner that is producing a gas fire, where the once heat-treated standard tempered glass fragments of claim 8, wherein each member of the plurality of once heat-treated standard tempered glass fragments has a substantially rounded bead-like shape.

12. The process for forming once heat-treated standard glass fragments suitable for insertion into a fireplace with a gas burner that is producing a gas fire, where the once heat-treated standard tempered glass fragments of claim 8, wherein the plurality of once heat-treated standard tempered glass fragments is colored.

13. A process for forming once heat-treated standard glass fragments suitable for insertion into a fire pit with a gas burner, an improvement comprising:

a layer of broken noncubical once heat-treated standard tempered glass fragments surrounding a flame from the gas burner;

the layer of non-cubical once heat-treated standard tempered glass fragments being made from broken once heat-treated standard tempered glass plates that have a surface compression of at least 3,500 and up to 10,000 pounds-force per square inch (psi);

the layer of broken non-cubical once heat-treated standard tempered glass fragments having a unique fracture pattern dependent upon the heat-treat temperature and quench then breaking the once heat-treated standard tempered glass plates;

the layer of broken non-cubical once heat-treated standard tempered glass fragments formed from non-cubical once heat-treated standard tempered glass fragments having sharp edges, sharp corners, and sharp burrs;

the layer of broken non-cubical once heat-treated standard tempered glass fragments having sharp edges, sharp corners, and sharp burrs being processed to having slightly rounded sharp edges, slightly rounded sharp corners, and slightly rounded sharp burrs making the broken processed non-cubical once heat-treated standard tempered glass fragments safe to handle by a human hand without hand protection;

wherein the processing of the broken non-cubical once heat-treated standard tempered glass fragments causes the broken non-cubical once heat-treated standard tempered glass to impact each other, smoothing the sharp edges, the sharp corners, and the sharp burrs of the non-cubical once heat-treated standard tempered glass fragments, resulting in broken non-cubical once heat-treated standard tempered glass fragments that are safe to handle without causing injury to the human hand.

14. The process for forming once heat-treated standard glass fragments suitable for insertion into a fire pit with a gas burner, where the once heat-treated standard tempered glass fragments of claim 13, wherein the process further comprises tumbling.

15. The process for forming once heat-treated standard glass fragments suitable for insertion into a fire pit with a gas burner, where the once heat-treated standard tempered glass fragments of claim 13, wherein the process further comprises vibrating.

16. The process for forming once heat-treated standard glass fragments suitable for insertion into a fire pit with a gas burner, where the once heat-treated standard tempered glass fragments of claim 13, wherein each member of the plurality of glass fragments has a substantially rounded bead-like shape.

17. The process for forming once heat-treated standard glass fragments suitable for insertion into a fire pit with a gas burner, where the once heat-treated standard tempered glass fragments of claim 13, wherein the plurality of glass fragments is colored.

* * * * *